US005552850A

United States Patent [19]
Matsumoto

[11] Patent Number: 5,552,850
[45] Date of Patent: Sep. 3, 1996

[54] HANDLE GRIP TO BE DETACHABLY FIXED TO A DISPOSABLE CAMERA EQUIPPED WITH A SPOOL OF FILM

[75] Inventor: Koji Matsumoto, Chiba, Japan

[73] Assignee: Nichimen Corporation, Osaka, Japan

[21] Appl. No.: 301,882

[22] Filed: Sep. 7, 1994

[30] Foreign Application Priority Data

Sep. 7, 1993 [JP] Japan ............................... 5-053419 U

[51] Int. Cl.$^6$ ................................................. G03B 11/00
[52] U.S. Cl. .................................................... 354/295
[58] Field of Search .............................. 354/467, 76, 81, 354/82, 295

[56] References Cited

U.S. PATENT DOCUMENTS

| | | | |
|---|---|---|---|
| 4,072,973 | 2/1978 | Mayo | 354/295 |
| 4,864,333 | 9/1989 | Barber | 354/295 |
| 5,400,113 | 3/1995 | Sosa et al. | 354/415 |

FOREIGN PATENT DOCUMENTS

| | | |
|---|---|---|
| 57-68227 | 4/1982 | Japan. |
| 31052 | 3/1991 | Japan. |

Primary Examiner—David M. Gray
Attorney, Agent, or Firm—Sughrue, Mion, Zinn, Macpeak & Seas

[57] ABSTRACT

Disclosed is a handle grip to be attached to the shutter button side of a disposable camera, which is equipped with a sprol of film. It comprises: a box-like body whose top plate is long enough to reach the shutter button of the disposable camera, and has an aperture to be in alignment with the shutter button when the handle grip is attached to the disposable camera by inserting the shutter button side of the disposable camera body; a push button fitted in the aperture of the top plate of the handle grip body, the push button being vertically movable, and being spring-biased upward and being adapted to push the shutter button to release the shutter at the end of the downward stroke of the push button when pushed down; a voice sound generator means for electronically generation g artificial voice utterance to attract the attention of children to be snaped; and a switching means to be closed by the push button on the way to the end of the downward stroke, thereby energizing the voice sound generator means.

It can generate artificial voice to draw children's attention to the camera at the instant of releasing the shutter, thus timing well the snapping of children.

9 Claims, 4 Drawing Sheets

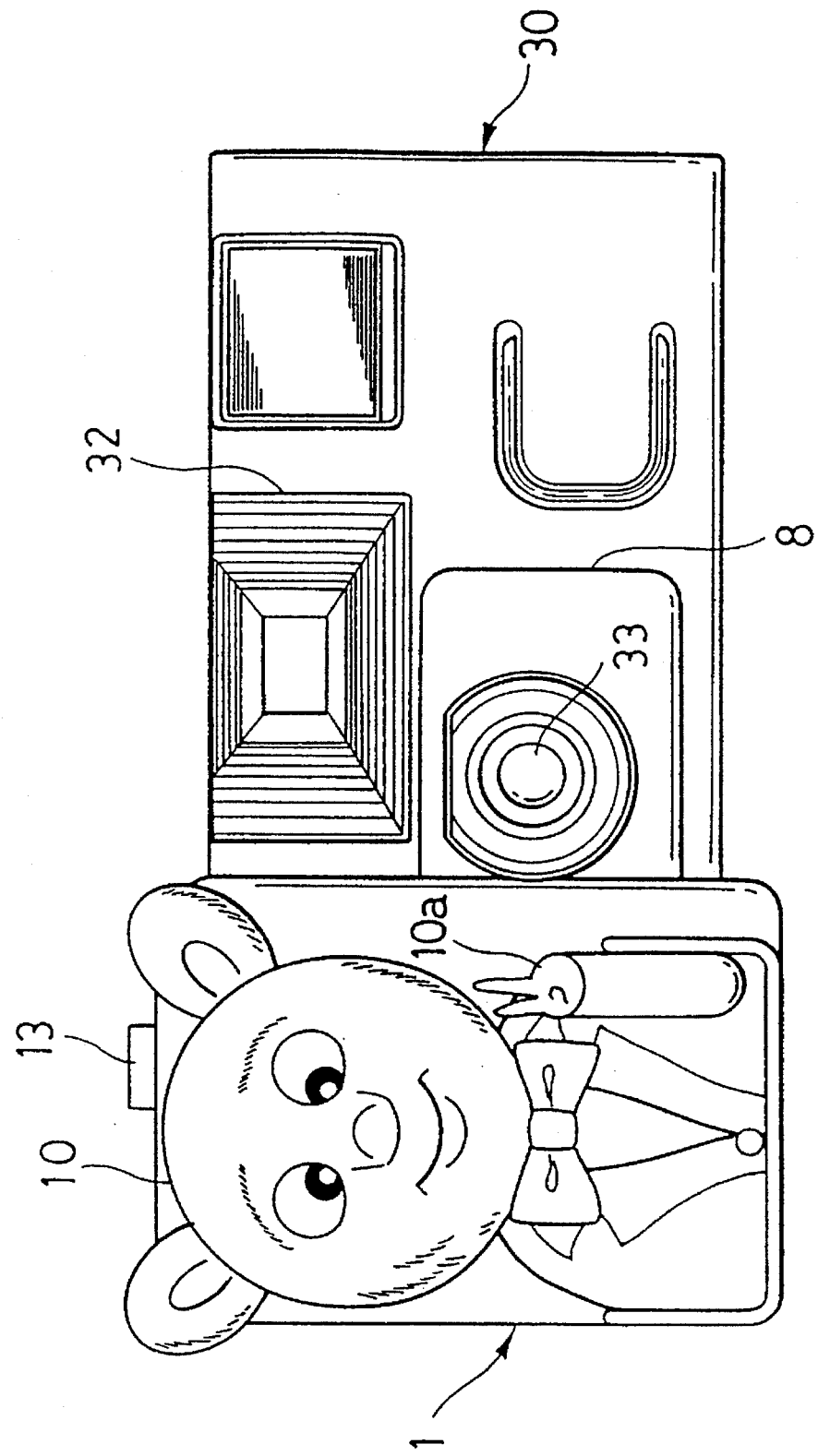

HANDLE GRIP TO BE DETACHABLY FIXED TO A DISPOSABLE CAMERA EQUIPPED WITH A SPOOL OF FILM

BACKGROUND OF THE INVENTION

1. Field of the Invention

The present invention relates to a handle grip to be detachably fixed to a disposable camera equipped with a spool of film.

2. Description of the Prior Art

Disposable cameras have been widely used for snapping.

When taking a snapshot of a baby or a very young child, a person holding a disposable camera in hand usually utters some words such as "cheese" or "Hey" in the hope of calling or drawing attention to the camera.

Such disposable cameras are so small that the holding of a camera in hand is not easy. What with its small size and what with its light weight, the camera cannot be held stably in hand, and therefore, the pictures thus taken are liable to lack sharpness in images.

Such disposable cameras have no straps, and therefore, they are not convenient for carrying.

SUMMARY OF THE INVENTION

One object of the present invention is to provide a disposable camera permitting a stable hold of the camera body in hand, capable of automatically electronically uttering some words to call or draw children's attention to the camera.

To attain this object a handle grip to be detachably fixed to a disposable camera equipped with a spool of film characterized in that the handle grip comprises: a box-like body whose top plate is long enough to reach the shutter button of the disposable camera, and has an aperture to be in alignment with the shutter button when the handle grip is attached to the disposable camera by inserting the shutter button side of the disposable camera body; a push button fitted in the aperture of the top plate of the handle grip body, the push button being vertically movable, and being spring-biased upward and being adapted to push the shutter button to release the shutter at the end of the downward stroke of the push button when pushed down; a voice sound generator means for electronically generating artificial voice utterance to attract the attention of children to be snaped; and a switching means to be closed by the push button on the way to the end of the downward stroke, thereby energizing the voice sound generator means.

Preferably the handle grip body has an object such as an animal shape or an animated cartoon character attached on its front, thereby causing children to direct their attention to the camera. Preferably the object has movable parts such as arms or legs, which movable parts are responsive to the closing of the switching means for moving.

Also, preferably the handle grip body has a light emitting means attached on its front, which light emitting means is responsive to the closing of the switching means for emitting light. In case that an animal shape or an animated cartoon character is fixed to its front, a light emitting means is preferably attached to its eyes.

Also, preferably the handle grip body has means to catch a length of strap.

A handle grip according to the present invention is designed to be attached to the shutter button side of a disposable camera, thereby permitting the stable grip of the camera body, and is designed to be capable of producing artificial voice prior to the release of the shutter, thereby causing very young children to direct their attention to the camera, thus timing well the snapping of such very young children.

BRIEF DESCRIPTION OF ATTACHED DRAWINGS

FIG. 2 is a front view of the disposable camera having the handle grip attached thereto;

PREFERRED EMBODIMENTS

Accompanying drawings show a handle grip according to one embodiment of the present invention. The handle grip is designed so as to be detachably fixed to a disposable camera equipped with a spool of film.

Figure 1A:
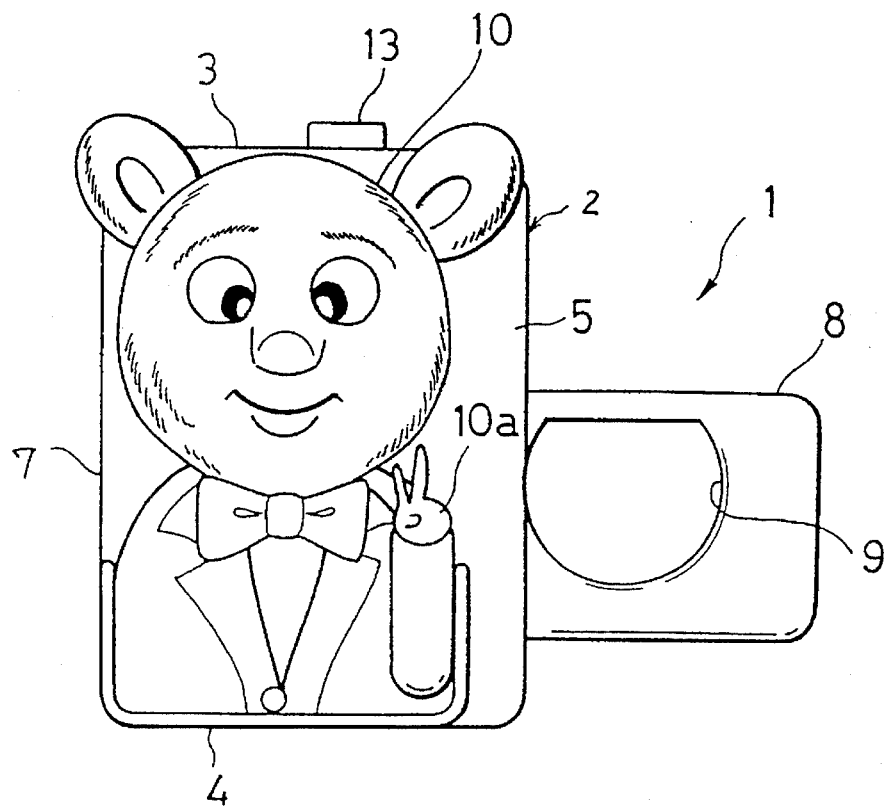
FIG. 1 is a front view each of a handle grip (upper) and a disposable camera equipped with a spool of film (lower), to which disposable camera the handle grip is to be fixed.
Figure 1B:
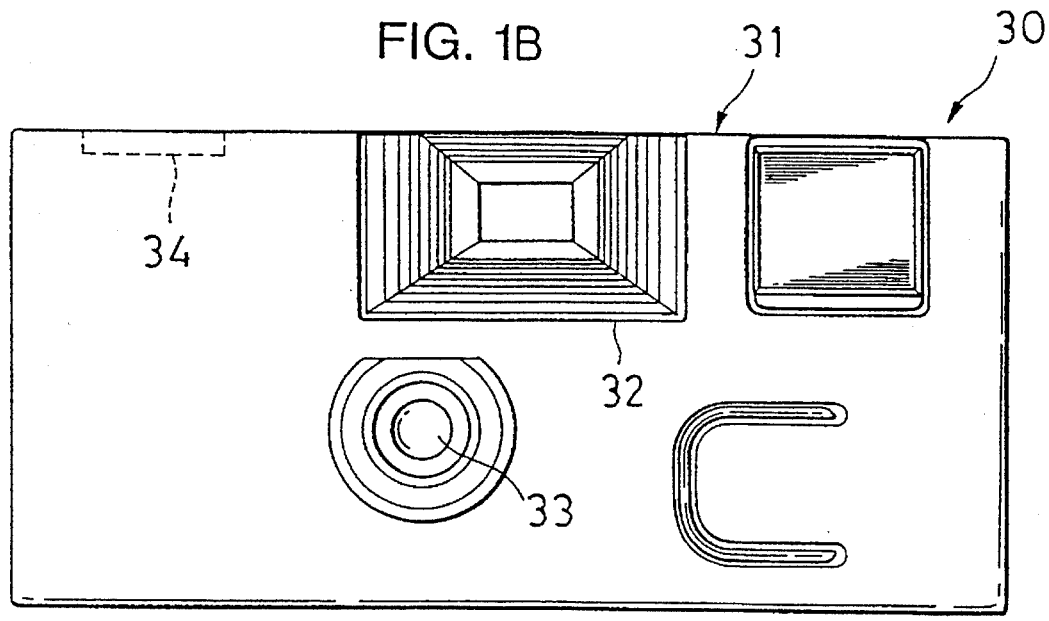
Figure 3:
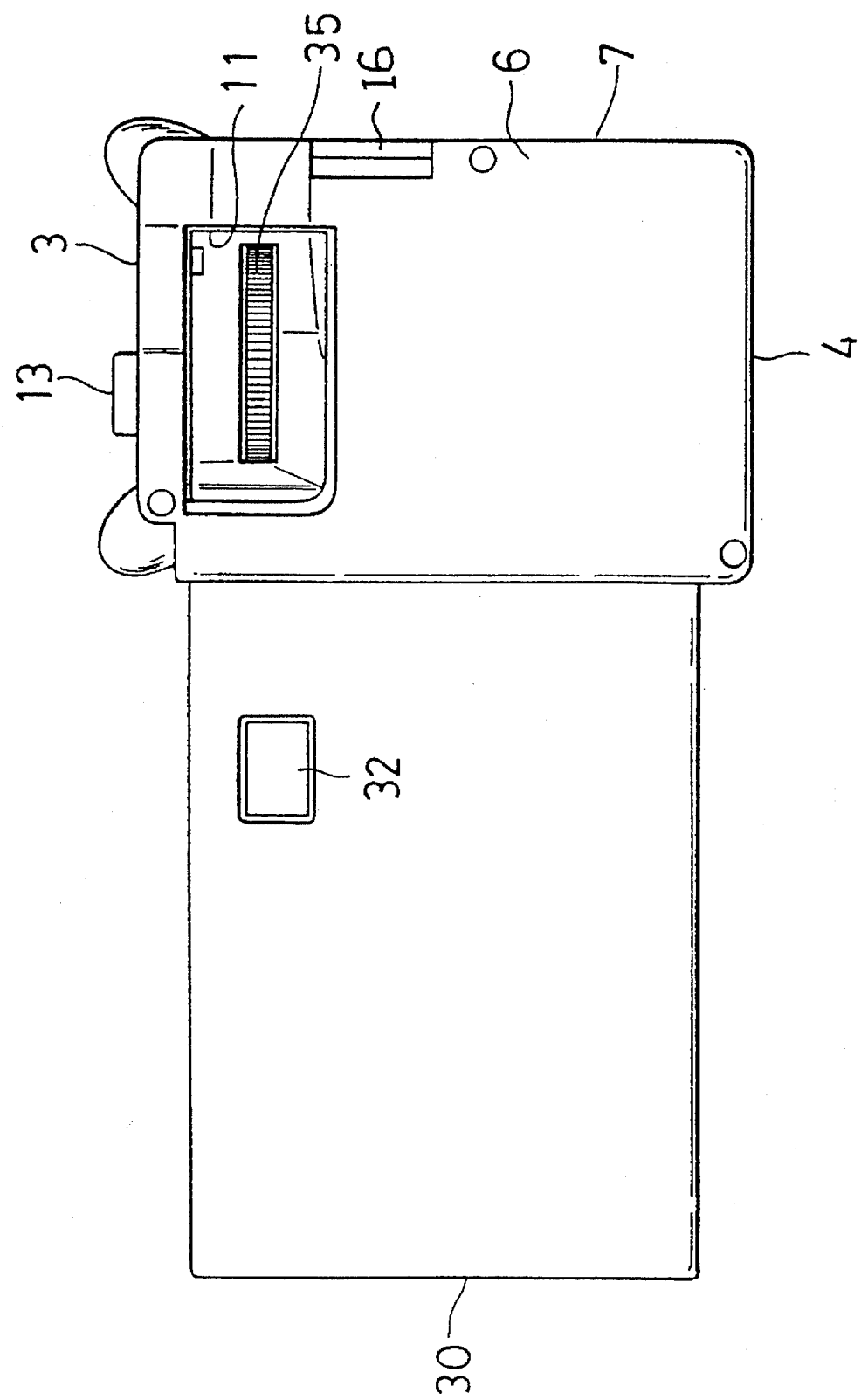
FIG. 3 is a rear view of the disposable camera having the handle grip attached thereto.
Figure 4:
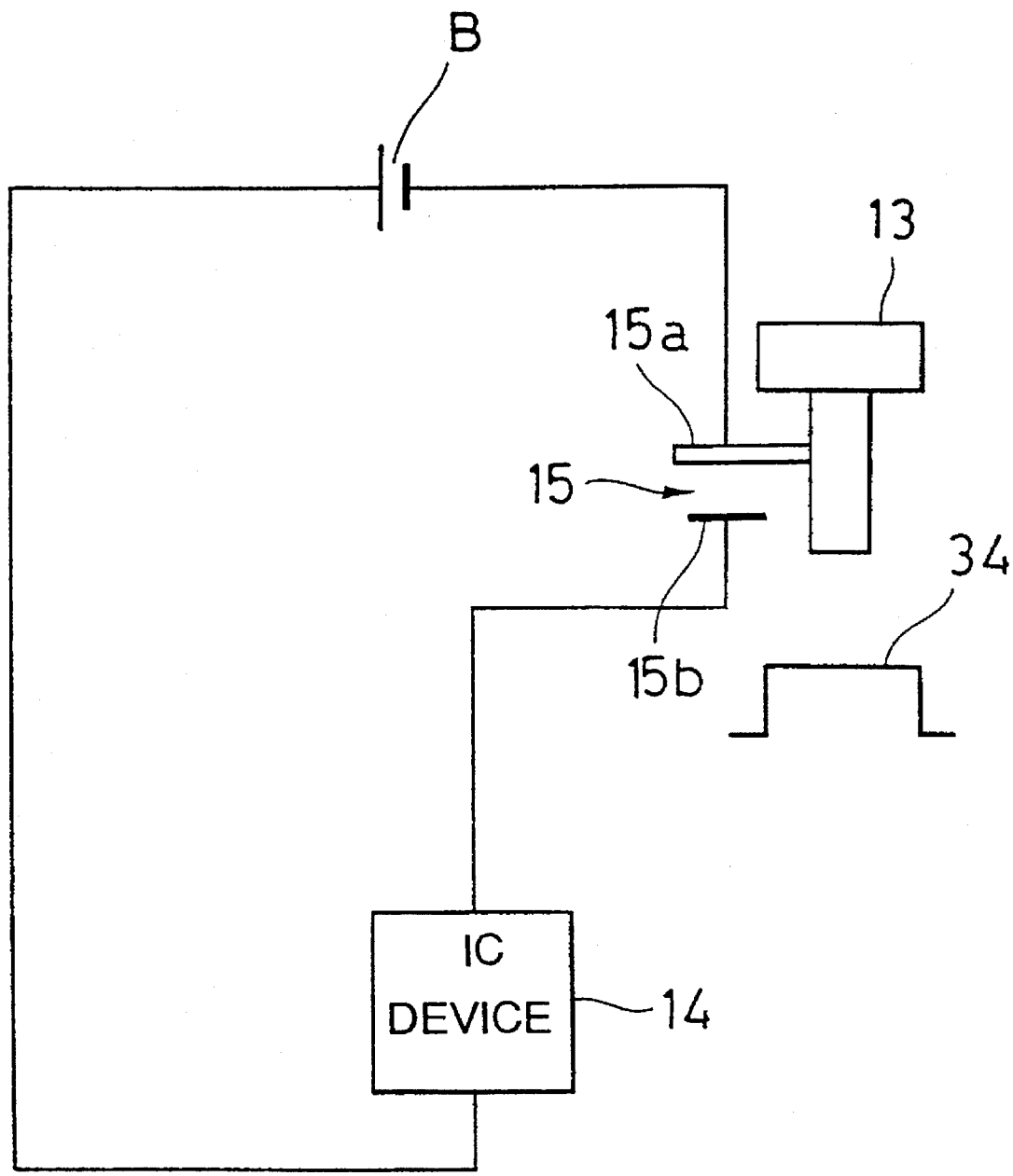
FIG. 4 shows one example of a voice sound generator circuit which is contained in the handle grip body.

FIG. 1 is a front view each of a handle grip 1 (upper) and a disposable camera 30 (lower) equipped with a spool of film (hereinafter referred to simply as "camera"). FIGS. 2 and 3 are front and rear views of the camera 30 having the handle grip 1 attached thereto.

The camera 30 has an elongated box-like body 31 of cardboard. It has a view-finder 32 formed at its center, top, and a lens 33 just below the view-finder 32. The lens 33 has a shutter (not shown) behind it. The elongated box-like body 31 has a shutter button 34 on its top plate at the left side of the view-finder 32 in FIG. 1 (or at the right side of the view-finder 32 as viewed from the rear side of the camera body 31), and the shutter can be released by pushing down the shutter button 34.

Usually the handle grip 1 is made of plastics, and has a rectangular box-like shape. It is composed of a top plate 3, a bottom plate 4, a front plate 5 and a rear plate 6 (see FIG. 3), and a right side plate 7 (as viewed from the rear side of the handle grip body). It opens at its left side to permit insertion of the camera body 31. The left opening of the handle grip 1 has such a shape and size as to permit the press-fitting of the shutter button side of the camera body 31, thereby not permitting the slipping-off of the camera body 31 from the handle grip 1.

Preferably the handle grip body 1 has a tongue plate 8 laterally extending from its front plate 5 toward the center of the camera body 31. The tongue plate 8 has an opening 9 at such a position that the lens projection may fit in the opening 9 when the handle grip 1 is attached to the camera body 31, thereby permitting the handle grip 1 to grip the camera body 31 still firmly.

The handle grip 1 has an animal shape or an animated cartoon character 10 attached on its front plate 5, thereby causing children to direct their attention to the camera. Such an animal shape or an animated cartoon character 10 is made for example, of plastics.

The rear plate 6 has a window 11 to permit the rotating of the winding wheel 35 of the spool of film from the outside.

The top plate 3 of the handle grip body 2 has a push button 13. It is vertically movable, and is spring-biased upward. It will push the shutter button 34 to release the shutter at the end of the downward stroke when it is pushed down.

The handle grip body 2 has an artificial voice generator IC 14 and an associated power supply B in a given space (not shown). The IC device 14 is designed to utter some words commonly used in calling attention to the camera, such as "cheese" or "Look at the camera." or call a child by his or her name. A button-like cell may be used as the power supply B. The associated circuit includes a switch 15, and the IC 14 is responsive to the closing of the switch 15 for uttering some words. The switch 15 has a movable contact 15a fixed to the push button 13 and a stationary contact 15b fixed to the handle grip body 2. The movable contact 15a will contact the stationary contact 15b on the way to the lower terminal point of the downward stroke of the push button 13, thereby closing the circuit. Then, the artificial voice generator IC 14 provides utterance of some words to draw children's attention to the camera. The front plate 5 or the animated cartoon character 10 may have fine apertures made therein for permitting the penetrating of such artificial voice.

As attention-drawing means other than the artificial voice an animal shape or an animated cartoon character may have movable arms 10a or legs, which are responsive to the closing of the switch 15 for moving, thereby drawing children's attention by sight. Another example of drawing children's attention is a light emitting means attached on the front of the camera body, preferably on the eyes of the animal shape or animated cartoon character. Likewise, such light emitting means is responsive to the closing of the switch 15 for emitting light. This attention-drawing means is particularly useful in taking a snapshot of children when the surrounding is dark. The attention-drawing means described may be used alone or in combination. The artificial voice generator means, however, should not be omitted, and therefore, it may be used by itself or in combination with other attention-drawing means. The artificial voice generator means may be of any desired form other than ICs, provided that it can be contained in the handle grip body 2.

Preferably the handle grip body 2 has means 16 to catch a length of strap, such as shown at the right edge of the rear plate 6 in FIG. 3. The disposable camera having a handle grip attached thereto can be carried conveniently by the strap (not shown).

As may be understood from the above, a handle grip according to the present invention can generate artificial voice to draw children's attention to the camera at the instant of releasing the shutter, thus timing well the snapping of children. Also, advantageously the handle grip permits a stable hold of the disposable camera, thereby improving the clearness of images in pictures thus taken.

What is claimed is:

1. A handle grip to be detachably fixed to a disposable camera equipped with a spool of film characterized in that the handle grip comprises: a box-like body whose top plate is long enough to reach the shutter button of the disposable camera, and has an aperture to be in alignment with the shutter button when the handle grip is attached to the disposable camera by inserting the shutter button side of the disposable camera body; a push button fitted in the aperture of the top plate of the handle grip body, the push button being vertically movable, and being spring-biased upward and being adapted to push the shutter button to release the shutter at the end of the downward stroke of the push button when pushed down; a voice sound generator means for electronically generating artificial voice utterance to attract the attention of children to be snapped; and a switching means to be closed by the push button on the way to the end of the downward stroke, thereby energizing the voice sound generator means.

2. A handle grip according to claim 1 wherein said handle grip body has an object such as an animal shape or an animated cartoon character attached on its front, thereby causing children to direct their attention to the camera.

3. A handle grip according to claim 2 wherein said object has movable parts such as arms or legs, which movable parts are responsive to the closing of the switching means.

4. A handle grip to be detachably fixed to a disposable camera equipped with a spool of film characterized in that the handle grip comprises: a box-like body whose top plate is long enough to reach the shutter button of the disposable camera, and has an aperture to be in alignment with the shutter button when the handle grip is attached to the disposable camera by inserting the shutter button side of the disposable camera body; a push button fitted in the aperture of the top plate of the handle grip body, the push button being vertically movable, and being spring-biased upward and being adapted to push the shutter button to release the shutter at the end of the downwward stroke of the push button when pushed down; a voice sound generator means for electronically generating artificial voice utterance to attract the attention of children to be snapped; a light emitting means attached on the front of the handle grip, and a switching means to be closed by the push button on the way to the end of the downward stroke, thereby energizing the voice sound generator means; and said light emitting means is responsive to the closing of the switching means for emitting light.

5. A handle grip according to claim 3 wherein said object has a light emitting means attached on its eyes.

6. A handle grip according to any of claims 1 to 5 wherein said handle grip body has means to catch a length of strap.

7. A handle grip according to 4 wherein said handle grip body has an object such as an animal shape or an animated cartoon character attached on its front, thereby causing children to direct their attention to the camera.

8. A handle grip according to claim 7 wherein said object has movable parts such as arms or legs, which movable parts are responsive to the closing of the switching means.

9. A handle grip according to claim 4 wherein said object has a light emitting means attached to the eyes thereof.

* * * * *